United States Patent
Jang et al.

(10) Patent No.: US 10,186,233 B2
(45) Date of Patent: *Jan. 22, 2019

(54) PORTABLE TERMINAL CAPABLE OF CONTROLLING DISPLAY BRIGHTNESS AND METHOD FOR CONTROLLING DISPLAY BRIGHTNESS THEREOF

(71) Applicant: Samsung Electronics Co., Ltd., Gyeonggi-do (KR)

(72) Inventors: Woo-Seok Jang, Gyeongsangbuk-do (KR); Jin-Sung Park, Gyeongsangbuk-do (KR); Hyong-Sog Oh, Gyeongsangbuk-do (KR); Ji-Hwa Kim, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,082

(22) Filed: Jan. 13, 2017

(65) Prior Publication Data

US 2017/0124986 A1   May 4, 2017

Related U.S. Application Data

(63) Continuation of application No. 13/243,497, filed on Sep. 23, 2011, now Pat. No. 9,548,041, which is a (Continued)

(30) Foreign Application Priority Data

Jun. 9, 2005   (KR) ........................ 10-2005-0049300

(51) Int. Cl.
   G06F 3/041   (2006.01)
   G09G 5/10   (2006.01)
   (Continued)

(52) U.S. Cl.
   CPC ................ G09G 5/10 (2013.01); G06F 3/02 (2013.01); G06F 3/041 (2013.01);
   (Continued)

(58) Field of Classification Search
   CPC ........... G09G 3/3406; G09G 5/10; G06F 3/02
   (Continued)

(56) References Cited

U.S. PATENT DOCUMENTS 5,671,014 A * 9/1997 Ito .......................... H04N 5/232
                                                             345/173
6,392,638 B2   5/2002   Hanajima et al.
(Continued)

FOREIGN PATENT DOCUMENTS

CN         1661663         8/2005
CN         1680999         10/2005
(Continued)

OTHER PUBLICATIONS

European Search Report dated Oct. 25, 2006 issued in counterpart application No. 06003281.0.
(Continued)

*Primary Examiner* — Towfiq Elahi
(74) *Attorney, Agent, or Firm* — The Farrell Law Firm, P.C.

(57) ABSTRACT

A portable terminal is provided including a touch screen display; and a processor configured to control the touch screen display to display a brightness step selection interface for selecting a brightness step, receive, via the touch screen display, a first user input for selecting a first brightness step, control the touch screen display to display an indicator at a first position corresponding to the first brightness step and to control a brightness of the touch screen display based on the first brightness step, receive, via the touch screen display, a second user input for selecting a second brightness step, and
(Continued)

control the touch screen display to change a position of the indicator from the first position to a second position corresponding to the second brightness step and to change the brightness of the touch screen display based on the second brightness step.

18 Claims, 4 Drawing Sheets

Related U.S. Application Data continuation of application No. 11/340,617, filed on Jan. 27, 2006, now Pat. No. 9,318,074.

(51) Int. Cl.
| | |
|---|---|
| *G09G 3/34* | (2006.01) |
| *H04M 1/22* | (2006.01) |
| *H04W 52/02* | (2009.01) |
| *G06F 3/02* | (2006.01) |
| *G06F 3/0484* | (2013.01) |
| *H04M 1/725* | (2006.01) |

(52) U.S. Cl.
CPC ....... *G06F 3/04847* (2013.01); *G09G 3/3406* (2013.01); *H04M 1/22* (2013.01); *H04W 52/027* (2013.01); *G09G 2320/06* (2013.01); *G09G 2320/0626* (2013.01); *H04M 1/72583* (2013.01); *Y02D 70/00* (2018.01)

(58) Field of Classification Search
USPC ......... 345/87–104; 455/556, 567, 564, 556.1
See application file for complete search history.

(56) References Cited

U.S. PATENT DOCUMENTS

| | | | |
|---|---|---|---|
| 6,785,595 B2 | 8/2004 | Kominami et al. |
| 6,795,097 B1 | 9/2004 | Yamaguchi |
| 6,891,525 B2 | 5/2005 | Ogoro |
| 7,038,810 B1 | 5/2006 | Yamazoe et al. |
| 7,280,850 B2 | 10/2007 | Hama et al. |
| 7,605,829 B2 | 10/2009 | Oh |
| 2001/0013854 A1 | 8/2001 | Ogoro |
| 2003/0022699 A1 | 1/2003 | Lin |
| 2003/0081005 A1 | 5/2003 | Lin et al. |
| 2004/0012556 A1 | 1/2004 | Yong et al. |
| 2005/0043831 A1 | 2/2005 | Baudisch |
| 2005/0054384 A1 | 3/2005 | Pasquale et al. |
| 2005/0151716 A1 | 7/2005 | Lin |
| 2005/0183040 A1 | 8/2005 | Kondo et al. |

FOREIGN PATENT DOCUMENTS

| | | |
|---|---|---|
| GB | 2 403 096 | 12/2004 |
| JP | 2000-324239 | 11/2000 |
| JP | 2003-032357 | 1/2003 |
| JP | 2004274570 | 9/2004 |
| KR | 10199951191 | 7/1999 |
| KR | 1020050020665 | 3/2005 |
| TW | 578891 | 3/2004 |
| TW | I222338 | 10/2004 |
| WO | WO 00/41378 | 7/2000 |

OTHER PUBLICATIONS

Korean Office Action dated Mar. 14, 2006 issued in counterpart application No. 10-2005-0049300.
Sony Ericsson T230—User Manual—Second Edition (2004), XP 055387013, Jan. 1, 2004, 74 pages.
European Search Report dated Jul. 18, 2017 issued in counterpart application No. 17164973.7-1972, 10 pages.
U.S. Office Action dated Jan. 24, 2018 issued in counterpart U.S. Appl. No. 13/715,718, 39 pages.
Crestron Remote Control Systems, Crestron Series 3500: ColorTouch & VideoTouch, Touchpanels Operations Guide, Apr. 1998, 24 pages.
Chinese Office Action dated Jun. 1, 2018 issued in counterpart application No. 201510373708.6, 17 pages.
Alan Simpson, Brian Underdahl, "Windows XP Bible", 2001, Hungry Minds, p. 371.
Cheryl Price, "Learning Microsoft Windows XP", 2003, p. 78.
Steve Johnson, "Show Me Microsoft Windows XP", 2004, pp. 228-229.

\* cited by examiner

PORTABLE TERMINAL CAPABLE OF CONTROLLING DISPLAY BRIGHTNESS AND METHOD FOR CONTROLLING DISPLAY BRIGHTNESS THEREOF

PRIORITY

This application is a continuation of U.S. patent application Ser. No. 13/243,497, which was filed in the U.S. Patent and Trademark Office on Sep. 23, 2011, which is a continuation of U.S. patent application Ser. No. 11/340,617, which was filed in the U.S. Patent and Trademark Office on Jan. 27, 2006, issued as U.S. Pat. No. 9,318,074 on Apr. 19, 2016, and claims priority under 35 U.S.C. § 119(a) to Korean Patent Application Serial No. 10-2005-0049300, which was filed in the Korean Intellectual Property Office on Jun. 9, 2005, the entire disclosure of each of which is incorporated herein by reference.

BACKGROUND

1. Field of the Invention

The present invention relates to a portable terminal. More particularly, the present invention relates to a portable terminal capable of controlling a backlight and a method for controlling a backlight thereof.

2. Description of the Related Art

A conventional portable terminal having a backlight function turns on and off the backlight at a predetermined level of brightness for a period of time which is set by a user. Therefore, a user can operate the portable terminal containing the backlight function at night while using a lower illumination intensity.

The portable terminal can be programmed to set the on time of the backlight. Namely, in the case in which a user sets the on time of the backlight to thirty seconds, the portable terminal turns the backlight on for thirty seconds when the power is turned on or there are key input data, and the backlight is turned off after thirty seconds.

The backlight is generally turned on at a candela value of a predetermined brightness that is determined during the manufacturing process of the portable terminal. If a backlight of a predetermined brightness is turned on at night, however, the battery is unnecessarily consumed. Due to the low exterior illumination intensity at night, a user can see the display screen even with a backlight of a low brightness.

On the other hand, a user having a weak visual acuity may feel that the brightness of the fixed or predetermined backlight is too dark when the user uses the portable terminal at night with a low illumination intensity. In this case, if the brightness of the backlight can be made brighter, the user can operate the portable terminal more conveniently.

A need therefore exists for an improved portable terminal wherein the backlight can be controlled to reduce battery consumption or to better suit the needs of users requiring more backlight brightness than is provided by the initial manufacturers setting.

SUMMARY

Accordingly, the present invention has been made to address the above-mentioned problems, and an aspect of the present invention is to provide a portable terminal and a method for controlling a backlight.

It is another aspect of the present invention to provide a method for reducing battery consumption in a portable terminal having a backlight function.

In accordance with an aspect of the present invention, a portable terminal is provided for controlling a display brightness thereof. The portable terminal includes a touch screen display; and a processor configured to control the touch screen display to display a brightness step selection interface for selecting one of a plurality of brightness steps, receive, via the touch screen display, a first user input for selecting a first brightness step of the plurality of brightness steps, control the touch screen display to display an indicator at a first position corresponding to the first brightness step and to control a brightness of the touch screen display based on the first brightness step, receive, via the touch screen display, a second user input for selecting a second brightness step of the plurality of brightness steps, and control the touch screen display to change a position of the indicator from the first position to a second position corresponding to the second brightness step and to change the brightness of the touch screen display based on the second brightness step.

BRIEF DESCRIPTION OF THE DRAWINGS

The above and other objects, features, and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EMBODIMENTS

Hereinafter, various embodiments of the present invention will be described with reference to the accompanying drawings. In the following description of the present invention, a detailed description of known functions and configurations incorporated herein is omitted for clarity and conciseness.

Figure 1:
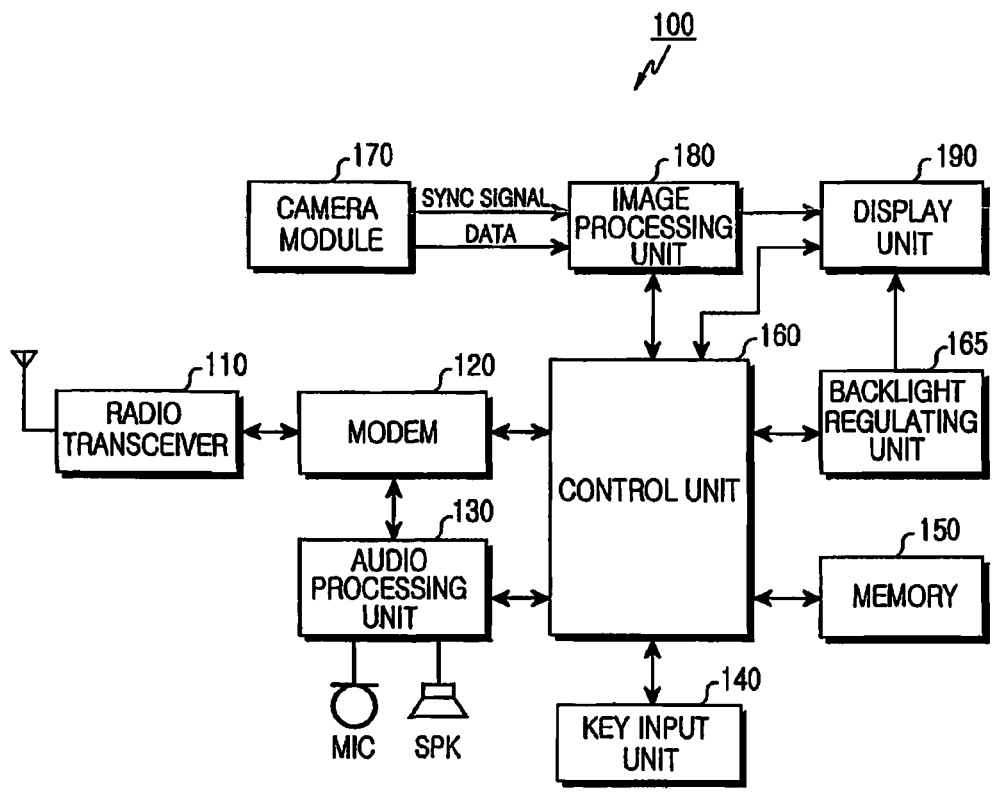
FIG. 1 is a block diagram illustrating a portable terminal according to an exemplary embodiment of the present invention.

FIG. 1 is a block diagram illustrating a portable terminal according to an exemplary embodiment of the present invention.

The portable terminal 100 comprises a radio transceiver 110, a modem 120, an audio processing unit 130, a key input unit 140, a memory 150, a control unit 160, a backlight regulating unit 165, a camera module 170, an image processing unit 180, and a display unit 190.

The radio transceiver 110 transmits and receives voice data, letter data, image data, and control data, under the control of the control unit 160. The radio transceiver 110 comprises a RF transmitter for raising and amplifying the frequencies of transmitted signals and an RF receiver for amplifying received signals with low noise and lowering the frequencies.

The modem 120 comprises a transmitter for encoding and modulating the transmitted signals and a receiver for decoding and demodulating the received signals.

The audio processing unit 130 can comprise a codec. The codec comprises a data codec for processing packet data and the like and an audio codec for processing audio signals such as voices and the like.

The audio processing unit 130 modulates the electrical signals input from a microphone and converts them to voice data, and demodulates the encoded voice data input from the radio transceiver 110 into electrical signals and outputs them to a speaker. Further, it is preferable that the audio processing unit 130 comprises a codec to convert the digital audio signals received by the radio transceiver 110 to analog signals and then reproduce them, or to convert the analog audio signals generated in the microphone to digital audio signals. The codec comprises a data codec for processing packet data and an audio codec for processing audio signals such as voices. The codec can be provided in the control unit 160.

The key input unit 140 has a key matrix structure (not shown), and comprises letter keys, number keys, function keys, and exterior volume keys to output the key input signals corresponding to the keys input by a user to the control unit 160.

The memory 150 can comprise a program memory and a data memory, and stores selected information on the basis of the information required for controlling the operation of the portable terminal 100 according to an exemplary embodiment of the present invention and the user selecting information. The memory 150 stores the backlight brightness values corresponding to the backlight steps, such as, the number and amount of incremental increases and correspondingly decreases in brightness level of a backlight that are generally preset during manufacturing of a portable terminal according to an exemplary embodiment of the present invention. The backlight brightness values preferably correspond to candela values (unit: cd) representing luminosity.

It is preferable that the memory 150 stores the backlight brightness values corresponding to the backlight steps as shown in the following Table 1 wherein an exemplary number of steps=5.

TABLE 1

|  | Backlight steps | | | | |
| --- | --- | --- | --- | --- | --- |
|  | 1 | 2 | 3 | 4 | 5 |
| Candela values (cd) | 100 | 125 | 150 | 175 | 200 |

Referring to Table 1, the backlight steps comprise five steps, and a candela value of 100 cd corresponds to the step 1 of the backlight, a candela value of 125 cd corresponds to the step 2 of the backlight, a candela value of 150 cd corresponds to the step 3 of the backlight, a candela value of 175 cd corresponds to the step 4 of the backlight, and a candela value of 200 cd corresponds to the step 5 of the backlight. Referring to Table 1, it can be seen that the backlight brightness is the brightest in step 5 and the candela value corresponding to the step 5 is the highest. On the other hand, although the backlight steps are divided into five steps in an exemplary embodiment of the present invention, they are not restricted thereto and can be divided into more or fewer steps.

On the other hand, the memory 150 can store the information in which predetermined keys correspond to the backlight steps having predetermined backlight brightness values as shown in the following Table 2.

TABLE 2

|  | Backlight steps | | | | |
| --- | --- | --- | --- | --- | --- |
|  | 1 (100 cd) | 2 (125 cd) | 3 (150 cd) | 4 (175 cd) | 5 (200 cd) |
| Corresponding Keys | Number key 1 | Number key 2 | Number key 3 | Number key 4 | Number key 5 |

Referring to Table 2, the backlight steps are divided into five steps, and the backlight step 1 whose candela value is 100 cd corresponds to the number key 1, the backlight step 2 whose candela value is 125 cd corresponds to the number key 2, the backlight step 3 whose candela value is 150 cd corresponds to the number key 3, the backlight step 4 whose candela value is 175 cd corresponds to the number key 4, and the backlight step 5 whose candela value is 200 cd corresponds to the number key 5.

Referring to Table 2, the backlight brightness is the brightest in step 5, and it is preferable that the numbers allocated to the number keys indicate the backlight steps. Although the backlight steps are divided into five steps in Table 2, they are not restricted thereto and can be divided into more or fewer steps.

The control unit 160 controls the overall operation of the portable terminal 100 according to an exemplary embodiment of the present invention. The control unit 160 stores in the memory 150 the predetermined backlight brightness values, that is, the candela values corresponding to the backlight steps. Further, the control unit 160 associates the predetermined keys, for example, the number keys, to the backlight steps having the backlight brightness values, and then stores them in the memory 150. Then, it is preferable that the control unit 160 controls the portable terminal so that the numbers allocated to the number keys correspond to the backlight steps.

If regulation of the backlight is requested by the user, the control unit 160 converts the operation mode of the portable terminal 100 to the backlight regulation mode and controls the brightness of the backlight by retrieving the backlight brightness values stored in the memory 150 so as to correspond to the backlight steps required by the user through the key input unit 140 in the backlight regulation mode. It is preferable that after converting the operation mode of the portable terminal 100 to the backlight regulation mode, the control unit 160 controls the portable terminal so that the display unit 190 displays a step selecting screen for selecting the backlight step by a user.

On the other hand, if one of the predetermined keys, for example, one of the number keys, stored in Table 2 is input, the control unit 160 can control the brightness of the backlight in the backlight step corresponding to the input key in the backlight regulation mode. In other words, if the user inputs the number key 5 through the key input unit 140 in the backlight regulation mode, the brightness of the backlight is regulated to the brightness of the step 5 by the control unit 160.

It is preferable that the control unit 160 controls the portable terminal so that at least one of the currently regulated backlight steps and the backlight brightness values is displayed on the display unit 190 in order that the user can easily recognize the currently regulated backlight brightness.

The backlight regulating unit 165 regulates the backlight brightness of the display unit 190 according to the backlight brightness value output by the control unit 160. The backlight regulating unit 165 can be included in the control unit 160.

In the case in which the portable terminal 100 has a camera function, it can comprise the camera module 170.

The camera module 170 can comprise a lens unit (not shown) which can be inserted and withdrawn, and photographs image data.

Further, the camera module 170 comprises a camera sensor (not shown) for converting the photographed optical signals into electrical signals and a signal processing unit (not shown) for converting the analog image signals photographed by the camera sensor to digital data.

Here, the camera sensor is assumed to be a Charge Coupled Device (CCD) sensor, and the signal processing unit can be embodied with a Digital Signal Processor (DSP). The camera sensor and the signal processing unit can be embodied integrally or separately.

The image processing unit 180 generates screen data for displaying the image signals output in the camera module 170.

The image processing unit 180 processes the image signals output in the camera module 170 in frame unit and outputs the frame image data according to the characteristics and size of the display unit 190. Further, the image processing unit 180 comprises an image codec. The image processing unit 180 compresses the frame image data shown on the display unit 190 or restores the compressed frame image data to the original frame image data.

Further, the image processing unit 180 is assumed to have an On Screen Display (OSD) function and can output the OSD data according to the size of the screen displayed under the control of the control unit 160.

The display unit 190 can comprise a Liquid Crystal Display (LCD) and the like and outputs the display data generated in the portable terminal. Then, if the LCD is the touch screen type, the display unit 190 can be used as an input unit.

Further, the display unit 190 displays the image signals output in the image processing unit 180 and displays the user data output in the control unit 160.

Further, it is preferable that the display unit 190 comprise white light emitting diodes for the backlight function, and according to an exemplary embodiment of the present invention, the light emitting diodes are assumed to emit the light in the brightness of 150 cd to perform the backlight function unless they are otherwise adjusted by the user.

Figure 2:
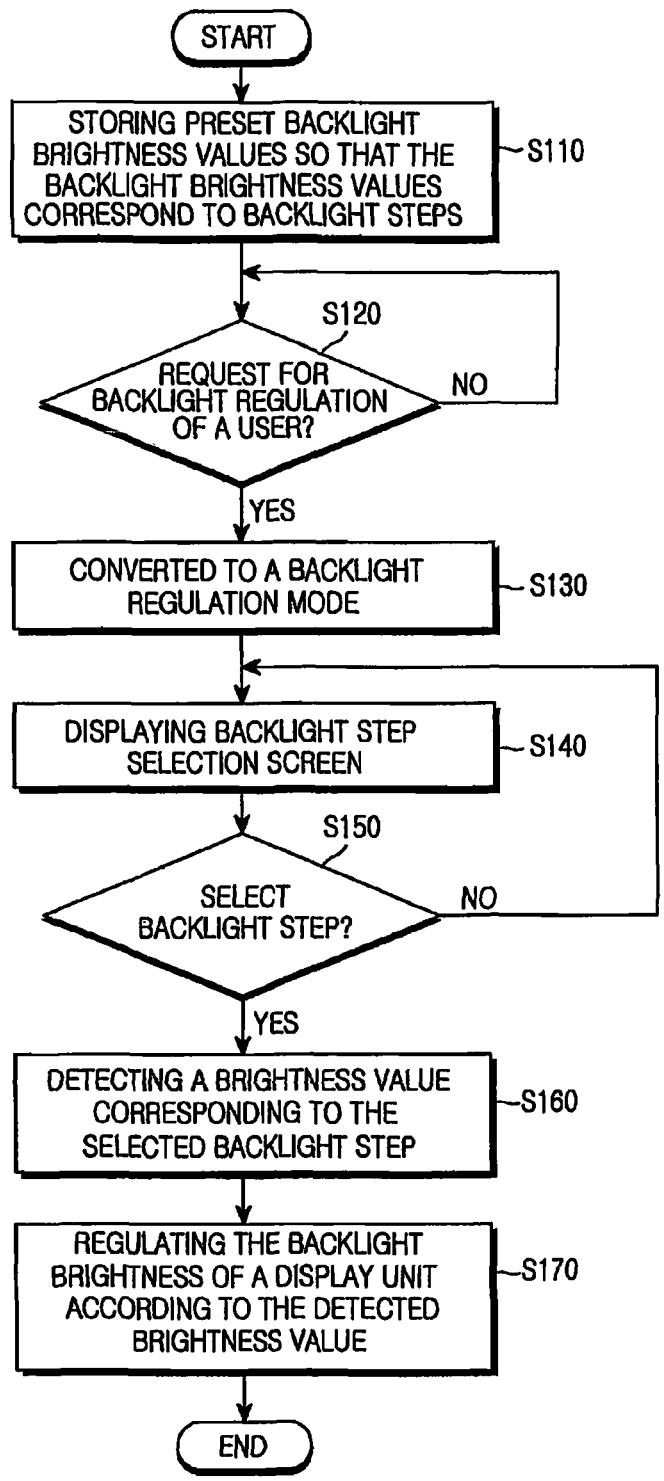
FIG. 2 is a flow chart illustrating the operation of a portable terminal according to an exemplary embodiment of the present invention.

FIG. 2 is a flow chart illustrating the operation of the portable terminal according to an exemplary embodiment of the present invention.

Referring to FIGS. 1 and 2, the control unit 160 matches the preset backlight brightness values to the backlight steps and stores them in the memory 150. It is preferable that when the control unit 160 associates the preset backlight brightness values to associated backlight steps and stores them in the memory 150 at step S110, they are stored in a table as in Table 1.

The control unit 160 examines whether there is a request for backlight regulation by the user, for example, a request through menu key input by the user. On the other hand, in an exemplary embodiment of the present invention, the backlight means the screen backlight brightness of the display unit 190 at step S120.

The control unit 160 converts the operation mode of the portable terminal 100 to the backlight regulation mode if there is the request for the backlight regulation at step S130.

If the operation mode of the portable terminal 100 is converted to the backlight regulation mode, the control unit 160 displays the backlight step selection screen for selecting a backlight step on the display unit 190 at step S140.

The control unit 160 checks whether a backlight step is selected on the basis of the selection information of the user at step S150.

If a backlight step is selected on the basis of the selection information of the user, the control unit 160 detects the brightness value corresponding to the selected backlight step from the memory 150 at step S160.

The control unit 160 regulates the backlight brightness of the display unit 190 by controlling the backlight regulating unit 165 according to the retrieved backlight brightness value at step S170. Then, the control unit 160 can display the backlight step or the brightness value on the display unit so that the user can easily recognize the currently regulated backlight brightness.

Figure 3:
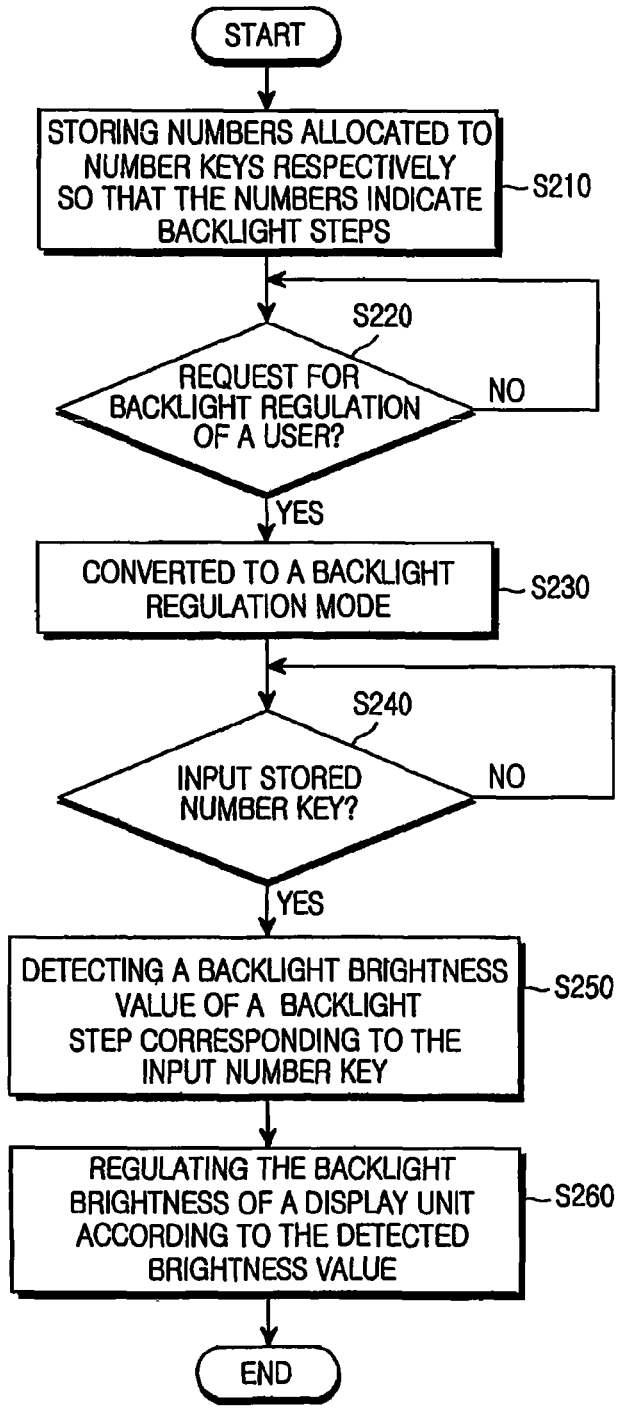
FIG. 3 is a flow chart illustrating the operation of a portable terminal according to an exemplary embodiment of the present invention.

FIG. 3 is a flow chart illustrating the operation of a portable terminal according to an exemplary embodiment of the present invention.

Referring to FIGS. 1 and 3, the control unit 160 assigns predetermined keys (for example, number keys) to the backlight steps having predetermined backlight brightness values and stores them in the memory 150 at step S210. Then, it is preferable that the numbers allocated to the number keys indicate the backlight steps.

The control unit 160 examines whether there is a request for the backlight regulation of the user, for example, a request through menu key input of the user at step S220.

If there is a request for backlight regulation, the control unit 160 converts the operation mode of the portable terminal 100 to the backlight regulation mode at step S230.

The control unit 160 determines whether the number keys, such as the number keys registered in Table 2, stored in the memory are input through the key input unit 140 at step S240.

If one of the number keys registered in Table 2 is input, the control unit 160 retrieves from memory the backlight brightness value of the backlight step corresponding to the input number key at step S250. For example, if the number key 5 to which the step 5 is allocated is input through the key input unit 140, the backlight brightness is regulated to the backlight brightness value that corresponds to the step 5.

The control unit 160 regulates the backlight brightness of the display unit 190 by controlling the backlight regulating unit 165 according to the detected backlight brightness value at step S260. Then, the control unit 160 can display the backlight step or the brightness value on the display unit so that the user can easily recognize the currently regulated backlight brightness.

Figure 4A:
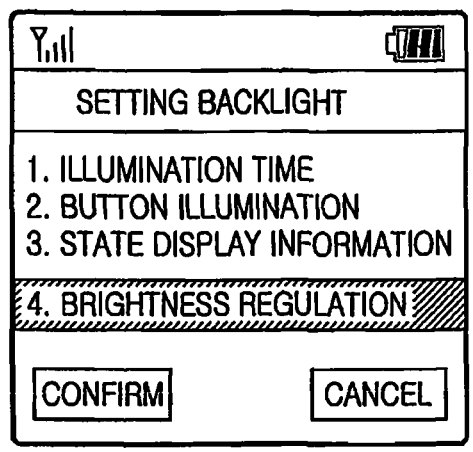
FIGS. 4A and 4B are exemplary views illustrating the operation of a portable terminal according to an exemplary embodiment of the present invention.

FIGS. 4Aa and 4B are exemplary views illustrating the operation of a portable terminal according to an exemplary embodiment of the present invention.

Hereinafter, FIGS. 4A and 4B will be explained with reference to FIGS. 1 to 3.

FIG. 4A shows a screen for requesting for backlight regulation of the portable terminal by a user.

Figure 4B:
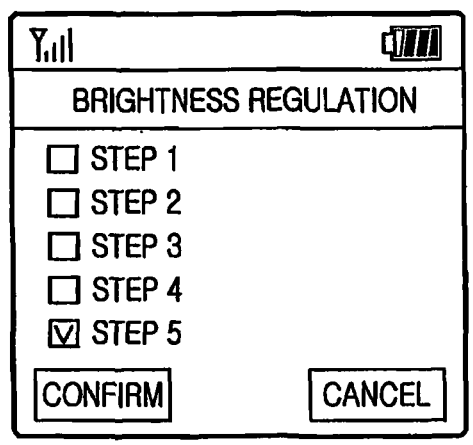

If the user selects the "4. illumination brightness regulation" menu item in the screen of FIG. 4A through a direction key or other input and inputs the confirmation key, the portable terminal shows a screen for regulating the illumination brightness as shown in FIG. 4B.

In FIG. 4B, the backlight regulation steps comprise total five steps, and selection flags are provided in the front of the items representing the steps respectively so that the selected item can be checked whenever the backlight step is selected. In FIG. 4B, the user has selected the step 5.

On the other hand, it is preferable that the backlight of the display unit 190 is regulated to the brightness corresponding to the step selected by the user so that the user can recognize the backlight brightness corresponding to each step.

According to an exemplary embodiment of the present invention, the user can properly regulate the backlight of the portable terminal 100 according to the situation, and can reduce the consumption of the battery due to the user of the backlight of unnecessary brightness.

Although exemplary embodiments of the present invention describe the backlight brightness regulation of the display unit of the portable terminal, the present invention can be applied to the backlight regulation of a keypad. Further, while the invention has been shown and described with reference to certain preferred embodiments thereof, it will be understood by those skilled in the art that various changes in form and details may be made therein without departing from the spirit and scope of the invention as defined by the appended claims.

As mentioned above, the present invention can properly regulate the backlight brightness of a portable terminal, if necessary, by providing a portable terminal controlling the backlight and a method for controlling the backlight.

Further, since the present invention can regulate the backlight brightness at night so that the illumination intensity is low, battery consumption can be reduced.

What is claimed is:

1. A portable terminal, comprising:
   a touch screen display; and
   a processor configured to:
      control the touch screen display to display a brightness selection interface for selecting one of a plurality of brightness steps, wherein the plurality of brightness steps are from a lowest brightness step to a highest brightness step,
      receive, via the touch screen display, a first user input for selecting a first brightness step of the plurality of brightness steps, at a first position of the brightness selection interface,
      control the touch screen display to display an indicator at the first position at which the first user input is received and control a brightness of the touch screen display based on the first brightness step corresponding to the first position,
      receive, via the touch screen display, a second user input for selecting a second brightness step of the plurality of brightness steps, at a second position of the brightness selection interface, and
      control the touch screen display to change a position of the indicator from the first position to the second position at which the second user input is received without displaying the indicator at any intermediate position between the first position and the second position and change the brightness of the touch screen display based on the second brightness step corresponding to the second position.

2. The portable terminal of claim 1, wherein each of the first user input and the second user input is a single selection user input.

3. The portable terminal of claim 1, wherein the brightness selection interface includes the first position and the second position.

4. The portable terminal of claim 1, wherein the indicator is the only indicator displayed in the brightness selection interface.

5. The portable terminal of claim 1, wherein the processor is further configured to control the touch screen display to continue to display the brightness selection interface, when receiving the second user input, and after receiving the second user input.

6. The portable terminal of claim 1, wherein the processor is further configured to, in response to receiving a user input for converting an operation mode of the portable terminal to a brightness selection mode, convert an operation mode of the portable terminal to the brightness selection mode and control the touch screen display to display the brightness selection interface.

7. The portable terminal of claim 1, wherein the processor is further configured to change the position of the indicator and change the brightness of the touch screen display in direct response to receiving the second user input.

8. A portable terminal comprising:
   a touch screen; and
   a processor configured to:
      control to display a brightness value selection interface for selecting one of a plurality of brightness values, wherein the plurality of brightness values are from a lowest brightness values to a highest brightness value,
      receive a first user input for selecting a first brightness value of the plurality of brightness values, at a first position of the brightness value selection interface,
      control to display an indicator to be disposed at the first position at which the first user input is received and control a brightness of the touch screen based on the first brightness value corresponding to the first position,
      receive a second user input for selecting a second brightness value of the plurality of brightness values, at a second position of the brightness value selection interface, and
      control to change a position of the indicator from the first position to the second position at which the second user input is received without displaying the indicator at any intermediate position between the first position and the second position and change the brightness of the touch screen based on the second brightness value corresponding to the second position.

9. The portable terminal of claim 8, wherein the first user input and the second user input are each a single selection user input.

10. The portable terminal of claim 8, wherein the brightness value selection interface includes the first position and the second position.

11. The portable terminal of claim 8, wherein the indicator is displayed at only one position of the brightness value selection interface at a time.

12. The portable terminal of claim 8, wherein the processor is configured to control the display to:
   continue to display the brightness value selection interface when receiving the second user input, and
   continue to display the brightness value selection interface after receiving the second user input.

13. The portable terminal of claim 8, wherein the processor is configured to, in response to receiving a user input for converting an operation mode of the portable terminal to a brightness selection mode, convert an operation mode of the portable terminal to the brightness selection mode and control the touch screen to display the brightness value selection interface.

14. The portable terminal of claim 8, wherein the changing of the position of the indicator and controlling of the brightness of the touch screen occur in direct response to receiving the second user input.

15. A portable terminal, comprising:
a touch screen display; and
a processor configured to:
control the touch screen display to display a brightness selection interface for selecting one of a plurality of brightness steps, wherein the plurality of brightness steps are from a lowest brightness step to a highest brightness step,
receive, via the touch screen display, a first user input for selecting a first brightness step of the plurality of brightness steps, at a first position of the brightness selection interface,
control the touch screen display to display an indicator to indicate the first position at which the first user input is received and control a brightness of the touch screen display based on a first brightness step corresponding to the first position,
receive, via the touch screen display, a second user input for selecting a second brightness step of the plurality of brightness steps, at a second position of the brightness selection interface, and
control the touch screen display to display the indicator to indicate the second position at which the second user input is received without displaying the indicator at any intermediate position between the first position and the second position and change the brightness of the touch screen display based on a second brightness step corresponding to the second position.

16. The portable terminal of claim 15, wherein the first user input and the second user input are each a single selection user input.

17. The portable terminal of claim 15, wherein the brightness step selection interface includes the first position and the second position,
wherein the indicator is displayed at only one position of the brightness step selection interface at a time, and
wherein the processor is configured to control the display to:
continue to display the brightness step selection interface when receiving the second user input, and
continue to display the brightness step selection interface after receiving the second user input.

18. The portable terminal of claim 15, wherein the processor is configured to, in response to receiving a user input for converting an operation mode of the portable terminal to a brightness selection mode, convert an operation mode of the portable terminal to the brightness selection mode and control the touch screen to display the brightness step selection interface, and
wherein the changing of the position of the indicator and controlling of the brightness of the touch screen occur in direct response to receiving the second user input.

* * * * *